United States Patent [19]

Cochran et al.

[11] Patent Number: 4,735,654
[45] Date of Patent: Apr. 5, 1988

[54] PROCESS FOR REDUCTION OF METAL COMPOUNDS BY REACTION WITH ALKALINE EARTH METAL ALUMINIDE

[75] Inventors: C. Norman Cochran, Oakmont, Pa.; Melvin H. Brown, Morning Sun, Iowa

[73] Assignee: Aluminum Company of America, Pittsburgh, Pa.

[21] Appl. No.: 946,002

[22] Filed: Dec. 24, 1986

[51] Int. Cl.$^4$ .................. C22B 26/00; C22B 26/10; C22B 26/20
[52] U.S. Cl. ........................................ 75/66; 75/67 R
[58] Field of Search ............................ 75/66, 67 R

[56] References Cited

U.S. PATENT DOCUMENTS

| | | | |
|---|---|---|---|
| 1,797,131 | 3/1931 | De Bore | 75/66 |
| 2,810,635 | 10/1957 | Cooper | 75/66 |
| 2,922,709 | 1/1960 | Hetzel | 75/66 |
| 3,971,653 | 7/1976 | Cochran | 75/10 R |
| 4,053,303 | 10/1977 | Cochran et al. | 75/68 A |
| 4,216,010 | 8/1980 | Kibby | 75/68 A |
| 4,299,619 | 11/1981 | Cochran et al. | 75/10 R |
| 4,385,930 | 5/1983 | Persson | 75/10 R |
| 4,388,107 | 6/1983 | Kibby | 75/10 R |
| 4,409,021 | 10/1983 | Moore | 75/10 R |
| 4,419,126 | 12/1983 | Kibby | 75/10 R |
| 4,445,934 | 5/1984 | Fujishige et al. | 75/68 A |
| 4,533,387 | 8/1985 | Holland et al. | 75/66 |

FOREIGN PATENT DOCUMENTS 0097993 11/1984 European Pat. Off. .

OTHER PUBLICATIONS

Dokiya et al., "Blast Furnace Process for Aluminum, Calcium Carbide, Calcium Hydride, and Titanium", Journal of Metals, vol. 37, No. 11, Nov., 1985.

Primary Examiner—L. Dewayne Rutledge
Assistant Examiner—David Schumaker
Attorney, Agent, or Firm—Andrew Alexander; John P. Taylor

[57] ABSTRACT

An improved process is disclosed for carbothermically producing an alkaline earth metal aluminide from an aluminum-bearing material which, in one aspect comprises forming a mixture of a carbonaceous reducing agent and a slag comprising the aluminum-bearing material, the alkaline earth metal compound; forming, at a first temperature, an alloy containing impurities in the slag; removing the alloy containing the impurities from the slag; and then heating the slag to a higher temperature to form the alkaline earth metal aluminide. The alkaline earth metal compound used in the process may comprise calcium carbide. Alternatively, both the alkaline earth metal compound and the aluminum-bearing material may be obtained using a calcium aluminate slag such as a byproduct from the steel industry. The calcium aluminate slag is purified in a preliminary step to remove silicon by alloying it with iron and then removing a ferrosilicon alloy formed in this step. Byproducts formed during the reactions may be recycled back if desired.

Either metallic aluminum, the alkaline earth metal, or both may be recovered from the aluminide material using, respectively a halide, a sulfurous, or a nitrogen stripping agent, or by reducing both metals in an electrolytic reduction cell. The alkaline earth metal aluminide may also be used as a reducing agent to recover other metals such as magnesium oxide by reduction from their respective compounds.

21 Claims, 2 Drawing Sheets

PROCESS FOR REDUCTION OF METAL COMPOUNDS BY REACTION WITH ALKALINE EARTH METAL ALUMINIDE

BACKGROUND OF THE INVENTION

1. Field of the Invention

This invention relates to the production of an alkaline earth metal aluminide material by a carbothermic reaction involving a reducible aluminum-bearing compound, a second reducible metal compound, and a carbonaceous reducing agent.

2. Description of the Related Art

Conventionally, aluminum is prepared by the electrolytic reduction of alumina in a Hall cell. However, processes involving the direct reduction of aluminum-bearing salts or oxides at high temperatures using carbonaceous reducing agents to form either aluminum or an aluminum alloy have been explored because of their potential for energy and cost savings.

In Cochran U.S. Pat. No. 3,971,653, there is described and claimed a carbothermic process wherein $Al_2O_3$ is reacted with carbon in a first zone to form a first liquid comprising alumina ($Al_2O_3$) and aluminum carbide ($Al_4C_3$). This liquid is then decomposed with increased temperature and/or decreased pressure to a second liquid comprising aluminum and carbon. Aluminum is then recovered from this second liquid.

Persson U.S. Pat. No. 4,385,930 discloses a method for producing aluminum which comprises providing a charge of carbon in a primary zone of an electric arc furnace containing a mixture of aluminum and aluminum carbide and providing a charge of alumina in a secondary zone of the furnace. The zones are heated to react aluminum with carbon to form aluminum carbide in the mixture in the first zone. The mixture flows into the second zone where the aluminum carbide reacts with alumina to form additional aluminum and an aluminum oxycarbide slag. This slag flows into the first zone for reaction with the aluminum carbide to produce aluminum which is tapped out of the second zone.

Cochran et al U.S. Pat. No. 4,053,303 describes a three step carbothermic reduction process to form aluminum-silicon alloys. Sources of alumina, silica, and carbon are reacted at a temperature of 1500° to 1600° C. to form silicon carbide and carbon monoxide. This mix is then brought to a temperature of 1600° to 1900° C. to form aluminum oxycarbide and carbon monoxide. The mix, now containing both silicon carbide and aluminum oxycarbide, is finally brought to a temperature in the range of 1950° to 2200° C. to produce an aluminum-silicon alloy.

The carbothermic production of an aluminum-silicon alloy is also described in European Patent Application Publication No. 0-097,993. The aluminum-silicon alloy is produced from a mixture of oxides of aluminum and silicon and oxides of alkali or alkaline earth metals by reducing the oxides using a carbon-based reducing agent in the presence of a plasma arc burner in a shaft reactor filled with reducing material. The reduction reaction takes place at a temperature exceeding 2000° C. with liquid products consisting of an aluminum-silicon alloy collected at the base of the shaft and the alkaline and/or alkaline earth metal oxides separated at the top of the reactor.

Such carbothermic processes, however, involve vaporization of some of the aluminum formed therein as well as back reaction problems that decrease the amount of yield which actually can be realized in conducting such a reduction process. To address this problem, Cochran et al U.S. Pat. No. 4,299,619 taught the production of aluminum by carbothermic reduction in a shaft-type reactor wherein an aluminum carbide precursor is formed by reacting alumina and carbon in an upper reaction zone of the reactor. The first liquid formed therein, comprising alumina and aluminum carbide, is transferred to a lower reaction zone to produce aluminum. Gaseous aluminum and $Al_2O$ vapor, which may be formed in the lower zone, may then be reclaimed in the upper zone which is maintained at a lower temperature. Any aluminum carbide separated from the liquid in the second zone may be returned to the first zone. In this way, at least some of the problems with regard to vaporization and back reaction may be alleviated.

Another problem which has been encountered in the production of aluminum by direct carbothermic reduction is the impurity of the aluminum product recovered from the process. Kibby U.S. Pat Nos. 4,419,126; 4,388,107; and 4,216,010 and Moore U.S. Pat. No. 4,409,021 address the problem of contamination of aluminum from a carbothermic process with aluminum carbide. The aluminum carbide-bearing aluminum is reacted with an alumina slag in the absence of reactive carbon. The reaction is said to produce aluminum and carbon monoxide or an aluminum tetraoxycarbide depending upon the reaction temperature. The patents refer to the use of a slag which also contains CaO to reduce the reaction temperature from about 2000° C. (3632° F.) down to about 1500° C. (2732° F.). Two possible modes of reaction are described. A reduction mode is said to involve the reduction of alumina by aluminum carbide at 2050° C. or higher to form molten aluminum and carbon monoxide. The other mode, termed the extraction mode, is said to involve the reaction between alumina and aluminum carbide to form non-metallic slag compounds, such as aluminum tetraoxycarbide.

Fijushige et al U.S. Pat. No. 4,445,934 teaches the formation of aluminum in a single step in a blast furnace using a charge containing an alumina-containing material and a mixture of a carbon material and a fluxing agent. The fluxing agent may be CaO or $CaCO_3$ or a mineral containing calcia or magnesia.

For the direct reduction of aluminum-bearing compounds with a carbonaceous material, i.e., a carbothermic process, to be economically attractive, the process should have minimum vaporization and back reaction losses, i.e., high yield, while producing an aluminum-bearing material from which aluminum or the other metal in the material may subsequently be recovered at a lower temperature.

SUMMARY OF THE INVENTION

We have now discovered that an alkaline earth metal aluminide material may be formed by the carbothermic reduction of an aluminum-bearing compound and an alkaline earth metal compound. We have further discovered that aluminum and the alkaline earth metal may be separated and independently recovered from the carbothermically formed aluminide at lower temperatures which therefore minimize vaporization losses which have characterized prior art processes.

It is therefore an object of this invention to provide an improved process for the carbothermic reduction of a reducible aluminum-bearing compound and an alkaline earth metal compound to form an alkaline earth metal aluminide.

It is another object of this invention to provide an improved process for the carbothermic reduction of a reducible aluminum-bearing compound in a reaction involving a reducible alkaline earth metal compound and a carbonaceous reducing agent to form an alkaline earth metal aluminide.

It is yet another object of this invention to provide an improved multiple step process for the carbothermic reduction of a reducible aluminum-bearing compound in a reaction wherein impurities are first reduced to form an alloy at a lower temperature and then, after removal of the so-formed impurity alloy, a reducible alkaline earth metal compound and a carbonaceous reducing agent are reacted with the aluminum-bearing compound to form an alkaline earth metal aluminide.

It is still another object of this invention to provide an improved process for the carbothermic reduction of a reducible aluminum-bearing compound in a reaction wherein calcium carbide and a carbonaceous reducing agent are reacted with the aluminum-bearing compound to form calcium aluminide.

It is a further object of this invention to provide an improved process for the carbothermic reduction of a reducible aluminum-bearing compound comprising an impure calcium aluminate slag wherein impurities, including silica, are removed by reacting the slag at a first temperature with a carbonaceous reducing agent and iron or iron oxide to form a ferrosilicon alloy and then, after removal of the so-formed ferrosilicon alloy and other reduced impurities, the carbonaceous reducing agent is further reacted at a higher temperature with the calcium aluminate slag to form calcium aluminide.

It is yet a further object of this invention to provide an improved process for the production and recovery of aluminum wherein an alkaline earth metal aluminide is first formed by the carbothermic reduction of a reducible aluminum-bearing compound and a reducible alkaline earth metal compound in a reaction with a carbonaceous reducing agent; and then the alkaline earth metal aluminide is contacted with a halide stripping agent to form metallic aluminum and an alkaline earth metal halide.

It is a still further object of this invention to provide an improved process for the production and recovery of aluminum wherein an alkaline earth metal aluminide is first formed by the carbothermic reduction of a reducible aluminum-bearing compound and a reducible alkaline earth metal compound in a reaction with a carbonaceous reducing agent; and then the alkaline earth metal aluminide is contacted with a sulfurous stripping agent to form metallic aluminum and an alkaline earth metal sulfide.

It is another object of this invention to provide an improved process for the production and recovery of aluminum and an alkaline earth metal wherein an alkaline earth metal aluminide is first formed by the carbothermic reduction of a reducible aluminum-bearing compound and a reducible alkaline earth metal compound in a reaction with a carbonaceous reducing agent; and the alkaline earth metal aluminide is then placed in an electrolytic reduction cell to form both aluminum and the alkaline earth metal in metallic form which may then be recovered from the cell.

It is yet another object of this invention to provide an improved process for the production and recovery of an alkaline earth metal wherein an alkaline earth metal aluminide is first formed by the carbothermic reduction of a reducible aluminum-bearing compound and a reducible alkaline earth metal compound in a reaction with a carbonaceous reducing agent; and then the alkaline earth metal aluminide is contacted with a nitrogen stripping agent to form aluminum nitride and the alkaline earth metal.

It is a still further object of this invention to provide an improved process for the production and recovery of aluminum wherein an alkaline earth metal aluminide is first formed by the carbothermic reduction of a reducible aluminum-bearing compound and a reducible alkaline earth metal compound in a reaction with a carbonaceous reducing agent; the alkaline earth metal aluminide is contacted with a stripping agent to form metallic aluminum and an alkaline earth metal compound; and at least the alkaline earth metal values from the alkaline earth metal compound are recycled back to the original reaction.

It is another object to provide an improved process wherein an alkaline earth metal aluminide, first formed by the carbothermic reduction of a reducible aluminum-bearing compound and a reducible alkaline earth metal compound in a reaction with a carbonaceous reducing agent, is used as a reducing agent to recover one or more other metals from their corresponding metal compounds by reaction therewith to reduce the metal in the metal compound.

These and other objects of the invention will be apparent from the accompanying description and drawings.

DETAILED DESCRIPTION OF THE INVENTION

The improved process of the invention comprises the production of an alkaline earth metal aluminide from various aluminum and alkaline earth metal sources by carbothermic reduction, the use of such an aluminide material, and the recovery of aluminum and/or the alkaline earth metal from this aluminide material.

a. Production of Alkaline Earth Metal Aluminide

Figure 1:
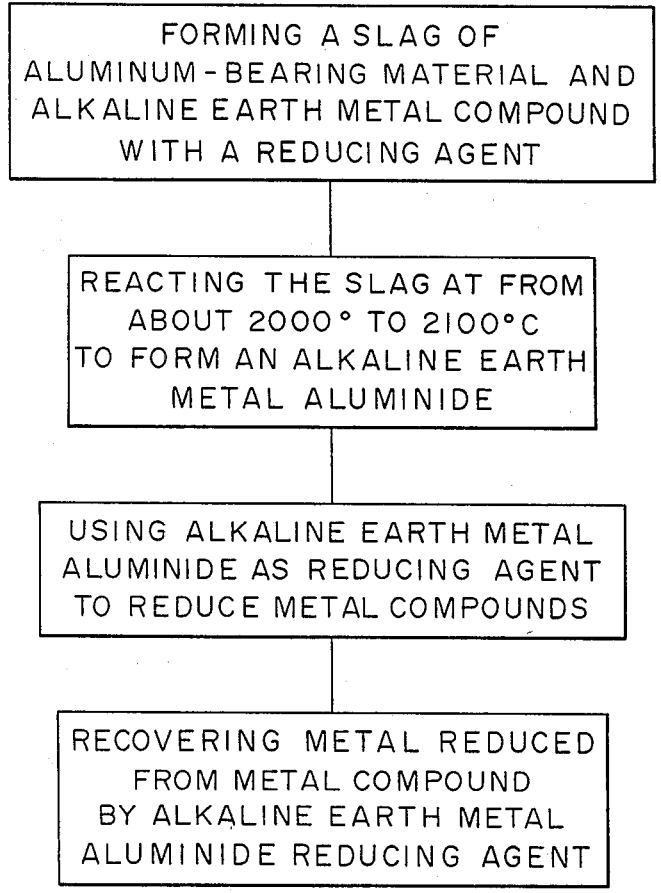
FIG. 1 is a flow sheet illustrating the process of the invention.
Figure 2:
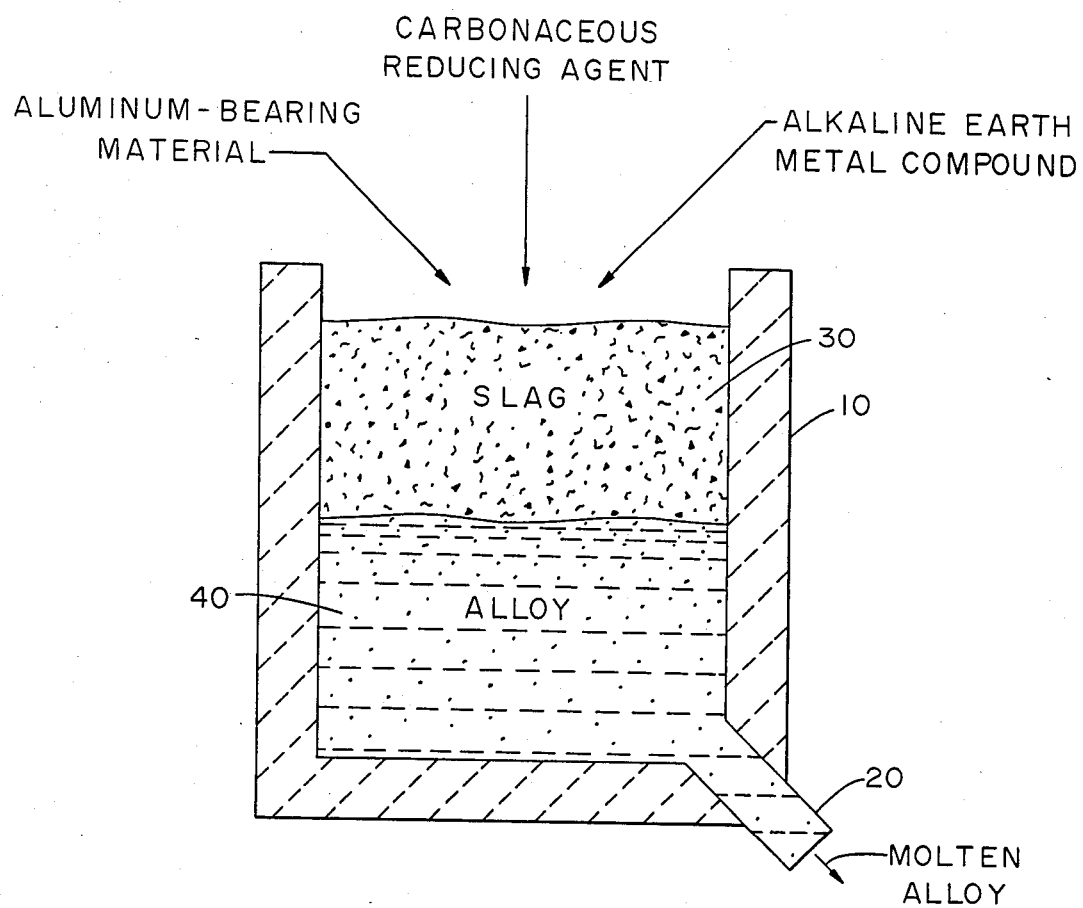
FIG. 2 is a schematic, vertical cross-sectional view of a reactor which may be used in the practice of the process of the invention.

In the practice of the invention, an aluminum-bearing material is charged to a reactor 10, as shown in FIG. 2, together with an alkaline earth metal compound and a carbonaceous reducing agent. The ratio of the aluminum-bearing material to the alkaline metal compound should be controlled to promote the formation of an alkaline earth metal dialuminide such as $CaAl_2$ in preference to tetraaluminide such as $CaAl_4$ since, for example, $CaAl_2$ is thought to inhibit formation of undesirable aluminum carbides more than would $CaAl_4$. This may be done by providing a ratio which will give a stoichiometric ratio of aluminum to alkaline earth metal just slightly in excess of that needed to form the dialuminide.

Heat can be supplied to reactor 10 using an electric arc, a plasma, or using other conventional heat sources which may include burning some of the carbonaceous material as fuel in a blast furnace.

The reactants are heated to an initial temperature of from about 1000° C., preferably about 1700° C., to just below 1900° C., preferably about 1850° C.. At this temperature, a slag layer 30, containing oxides of the alkaline earth metal and aluminum, is formed. However, impurities commonly found in the reactants, such as silicon, iron, and titanium, will react with the carbonaceous reducing agent at this temperature to form a ferrosilicon-titanium alloy layer 40 which can then be removed from the reaction mass. This ferrosilicon-titanium alloy may also contain other reduced impurities such as manganese, copper, and zinc if reducible impurities containing such metals are also present in the initial reactants. It should be noted that impurities may be introduced into the reaction either through the use of impure forms of the aluminum-bearing compound, or the alkaline earth metal compound or through the use of an impure form of the carbonaceous reducing agent.

Th ferrosilicon-titanium alloy containing other reduced impurities which is formed during this purification step is immiscible with the slag at temperatures above 1600° C.. and will sink to the bottom of the reactor where it may then be removed from the reaction mass by any acceptable means such as by draining the alloy from reactor 10 via an exit port 20 shown at the bottom of reactor 10.

The remaining reactants, which, at this point should comprise the alkaline earth metal oxide/aluminum oxide slag plus at least a portion of the initial charge of carbonaceous reducing agent with all or most of the impurities removed, are now further heated to a higher temperature of from about 2000° to 2100° C.., preferably about 2050° C.. to reduce both the aluminum oxide and the alkaline earth metal oxide to form the desired alkaline earth metal aluminide.

It should be noted here that all of the carbonaceous reducing agent may be added initially before the purification step unless the initial presence of sufficient carbonaceous reducing agent for both steps promotes the formation, with some impurities, of carbides which cannot be removed with the ferrosilicon alloy at the end of the purification step. It is preferred to add all of the carbonaceous reducing agent prior to the initial purification step because a less pure reducing agent can then be utilized and impurities in the carbonaceous reducing agent can also be removed during the purification step.

In one embodiment, the aluminum-bearing material and the alkaline earth metal compound may both comprise oxides of the respective metals. The oxides may be in either a pure or impure form. Calcium oxide (lime) is a particularly preferred reactant in view of its availability and cost.

The reaction equations, when calcium oxide is used as the alkaline earth metal compound, may be written as:

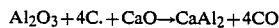
$$Al_2O_3 + 4C. + CaO \rightarrow CaAl_2 + 4CO$$

and/or

$$2Al_2O_3 + 7C + CaO \rightarrow CaAl_4 + 7CO$$

In either case, it will be seen that reaction product formed in addition to the alkaline earth metal aluminide, in this instance calcium aluminide, is carbon monoxide gas. Thus by carrying out the separation of impurities after the initial reaction step, a fairly pure alkaline earth metal aluminide product may be obtained. This product as will be discussed below, may be used as a reducing agent or the aluminide constituents may be separated to recover either or both of the metals as will also be described below.

In one embodiment of the invention, the alkaline earth metal compound may comprise calcium carbide which may be commercially purchased and therefore be used as a purified material. If a pure calcium carbide reactant is used, a more purified form of an aluminum-bearing compound, such as alumina, may also be used as well as a purified source of carbon. The calcium aluminide may then be produced by reacting the materials at a temperature of from about 1900° to 2000° C.. The use of the terms "purified" and "pure" are intended to mean a reactant which contains no more than 1 wt. % impurities, other than Ca containing compounds which are present in CaC$_2$.

The reaction equations, when calcium carbide is used as the alkaline earth metal compound, are:

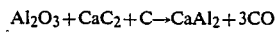
$$Al_2O_3 + CaC_2 + C \rightarrow CaAl_2 + 3CO$$

and/or

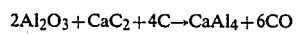
$$2Al_2O_3 + CaC_2 + 4C \rightarrow CaAl_4 + 6CO$$

It will be noted that an additional source of carbonaceous reducing agent is needed despite the presence of carbon in the calcium source. The ratio of the amounts of pure calcium carbide, alumina, and carbon which should be used in the reaction are 10–40 mole % CaC$_2$, 25–40 mole % Al$_2$O$_3$, and 30–60 mole % carbon.

The source of the aluminum-bearing material and the alkaline earth metal compound may also be a calcium aluminate slag such as found as a byproduct of the steel-making industry. This material, however, will contain impurities including silica and other silicon compounds. The silica, as well as other impurities present in the slag, may be removed, however, by first reacting the calcium aluminate slag at a temperature of from about 1600° to 1900° C.. with enough carbonaceous reducing agent and sufficient iron or iron oxide to form a ferrosilicon alloy containing less than 20 wt. % silicon which is then removed from the remaining slag.

The amount of iron added to the slag is crucial since silicon will form silicon carbide in the presence of carbon if the silicon content in the ferrosilicon alloy exceeds at 20 wt. %. Therefore, since the amount of silica usually found in such slag may be as high as 42 wt. %, it is usually prudent to react the slag with carbon and iron in a ratio of about 51 wt. % slag to at least about 40 wt. % iron and 9 wt. % carbon, or with carbon and iron oxide, in a ratio of about 39 wt. % slag to at least 44 wt. % Fe$_2$O$_3$ and 17 wt. % carbon to ensure substantially complete removal of the silica in the slag.

After formation of the ferrosilicon alloy, the alloy may be removed from reactor 10 using exit port 20 at the bottom of reactor 10 as previously described with respect to the ferrosilicon-titanium alloy.

b. Stripping of Alkaline Earth Metal Aluminide to Recover One or Both Metals

The alkaline earth metal aluminide, e.g., calcium aluminide, produced in accordance with the invention may be subsequently reacted with stripping agents to recover either or both metals.

Aluminum metal may be recovered from the alkaline earth metal aluminide by contacting the material with a halogen-containing material. Such halogen-containing stripping agents include F$_2$, Cl$_2$, Br$_2$, I$_2$, HF, HCl, HBr, HI, AlF₃, AlCl₃, AlBr₃. and AlI₃. Carbohalides represented by the formula $RX_n$ may also be used as the stripping agent to recover aluminum from the alkaline earth metal aluminide wherein R equals a 1-4 carbon chain; X equals F, Cl, Br, or I; and n equals an integer from 1 to 4 when R equals 1 carbon, and an integer from 1 to 6 when R equals 2 or more carbons.

When the halide stripping agent is in the form of a gas, it may be bubbled through the heated aluminide material while maintaining the aluminide material at a temperature of from above 540° C.. to 1100° C.., depending upon the composition. When the halide stripping agent is a solid or a liquid, it may be added to the aluminide material prior to heating followed by heating of the mixture to a temperature of from above 540° C.. to 1100° C.., depending upon the composition, and maintaining the reaction mass at this temperature for at least about 30 minutes. The amount of the halogen stripping agent which is mixed with the alkaline earth metal aluminide should be in excess of the amount needed to react with all of the alkaline earth metal present in the aluminide material to ensure production of nominally pure aluminum.

The alkaline earth metal in the aluminide material will react with the corresponding halide to form the halide of the alkaline earth metal and metallic aluminum. When a carbohalide is used, the carbonaceous portion of the stripping compound will be vaporized and removed through appropriate venting means over the reaction vessel. The metallic aluminum, as it forms, will sink to the bottom of the reaction vessel where it may be easily removed from the alkaline earth metal halide, for example, through exit port 20 in reactor 10 shown in FIG. 2.

The alkaline earth metal aluminide may also be reacted with a sulfurous stripping agent to recover metallic aluminum from the aluminide material. The sulfurous stripping agent may comprise elemental sulfur, $H_2S$, $Al_2S_3$, or other metal sulfides such as ferrous disulfide ($FeS_2$).

The stripping reaction is carried out by mixing the sulfurous stripping agent with the aluminide material in a mole ratio of at least 1 mole equivalent of stripping agent per mole of alkaline earth metal aluminide to provide sufficient sulfur to react with all of the alkaline earth metal present in the aluminide material to form metallic aluminum and an alkaline earth metal sulfide. The mixture is heated to a temperature of above 540° C.. up to 1100° C.. and maintained at this temperature for a period of at least about 30 minutes to provide for complete stripping of the alkaline earth metal from the aluminide material and reaction to form the sulfide. Metallic aluminum, which will sink to the bottom of the reactor, may then be drained through an appropriate port at the bottom of the reactor as previously described.

The aluminum and alkaline earth metal values may both be recovered from the alkaline earth metal aluminide using an electrolytic process. In this embodiment of the invention, the alkaline earth metal aluminide is placed in an electrolytic cell where it functions as the anode and alkaline earth metal, separated from the aluminide material, functions as the cathode. Advantageously, the molten aluminide material is placed in a fused bath cell as the bottom layer beneath the fused bath layer wherein the alkaline earth metal is electrolytically transported through the middle fused bath layer to form an upper layer of molten alkaline earth metal which functions as the cathode of the cell. When all of the alkaline earth metal in the aluminide material is electrolytically transported to the cathode layer, aluminum may be recovered from the anode layer and the alkaline earth metal may be recovered from the cathode layer.

A typical fused salt bath which can be used for this type of reaction comprises 0-100 wt. % calcium chloride and 100-0 wt. % potassium chloride. Typically the reaction is carried out at a temperature of at least 1080° C.., which can be dropped to about 800° C.. as the amount of calcium in the bath is lowered, using a current of about 1 to 20 amps/cm² and a voltage of about 1 to 10 volts to transport substantially all of the alkaline earth metal to the cathode layer.

To initiate the cell reaction, a layer of alkaline earth metal may be placed in the bath to function as the cathode during initiation of the electrolytic cell reduction. Aluminum may also be added to the cell upon start-up if found necessary.

If it is desired principally to recover only alkaline earth metal from the alkaline earth metal aluminide rather than aluminum or both alkaline earth metal and aluminum, or if the production and recovery of aluminum nitride is desired, the aluminide material may be reacted with a nitrogen gas whereby the aluminum is stripped from the aluminide material to form AlN leaving behind the reduced alkaline earth metal. This may be accomplished by heating the aluminide material to a temperature of at least 1100° C.. and bubbling sufficient dry $N_2$ through the heated aluminide material to strip all of the aluminum from the aluminide material leaving behind a layer of molten alkaline earth metal floating over the solid aluminum nitride. The temperature can be dropped to about 900° C.. as most of the aluminum is removed. Calcium, barium, magnesium, and strontium alkaline earth metals (and marginally beryllium) may be recovered in this manner.

The following equations illustrate an example of a particular process in accordance with the invention wherein metal sulfides, particularly ferrous disulfide, may be used as stripping agents to remove and recover metallic aluminum from calcium aluminide formed in accordance with the invention wherein the byproducts, particularly byproducts containing aluminum and calcium values, can be recycled back to the original reduction products.

$$(6CaO + 6Al_2O_3) + 24C \rightarrow 6CaAl_2 + 24CO \tag{1}$$

$$8Al_2O_3 + 6C + FeS_2 \rightarrow (6Al_2O_3 + 2Al_2S_3) + 3Fe + 6CO \tag{2}$$

$$(6Al_2O_3 + 2Al_2S_3) + 6CaAl_2 \rightarrow 16Al + (6Al_2O_3 + 6CaS) \tag{3}$$

$$(6Al_2O_3 + 6CaS) + 6H_2O + 6CO_2 \rightarrow (6Al_2O_3 + 6CaCO_3) + 6H_2S \tag{4}$$

$$(6Al_2O_3 + 6CaCO_3) \rightarrow (6CaO + 6Al_2O_3) + 6CO_2 \tag{5}$$

In this set of reactions, the original formation of the calcium aluminide, which occurs at a temperature range of about 2000° C.. to 2100° C.., is illustrated in equation (1) while the formation of aluminum sulfide and iron from alumina and ferrous disulfide, at a temperature equivalent to at least about 1600° C.. at 1 atmosphere pressure, (the Haglund Process) is shown in equation (2). The process shown in equation 2 may be carried out at higher or lower temperatures by varying the pressure of the reaction. The alumina/aluminum sulfide material in parentheses on the right side of equation (2) may then be reacted in equation (3), at a temperature of about 540° to 1100° C., with the calcium aluminide produced in equation (1) to form metallic aluminum and the mixture of alumina and calcium sulfide shown in parentheses on the right side of equation (3). This mixture of alumina and calcium sulfide from equation (3) may then be reacted, in equation (4), at a temperature of at least about 500° C., with water and carbon dioxide to form hydrogen sulfide and a mixture of alumina and calcium carbonate shown in parentheses on the right side of equation (4). This mixture of alumina and calcium carbonate from equation (4) may then be heated and reacted, in equation (5), to over 900° C. to form carbon dioxide and a mixture of alumina and calcium oxide, i.e., the initial reactants in equation (1) to which these reaction products may then be recycled.

In this embodiment, alumina, carbon, and ferrous disulfide are the only reactants which must be added to the process stream and both iron and aluminum may be recovered from the process. Ferrous selenide or ferrous telluride could be substituted for the ferrous disulfide in the above equations to also recover both iron and aluminum.

The following equations illustrate another example of a particular process, in accordance with the invention, wherein calcium aluminide, and subsequently metallic aluminum, is formed wherein the byproducts, particularly byproducts containing aluminum and calcium values, can be recycled back to the original reduction products.

$$4Al_2O_3 + 12C + 2CaX_2 \rightarrow 2CaAl_2 + 4AlX + 12CO \quad (1)$$

$$4AlX + 4CO \rightarrow 4/3AlX_3 + 4/3Al_2O_3 + 4C \quad (2)$$

$$2CaAl_2 + 4/3AlX_3 \rightarrow 2CaX_2 + 16/3Al \quad (3)$$

In these reactions, aluminum oxide (alumina) and a calcium halide such as calcium chloride may be reacted, as shown in equation (1), with carbon at a temperature of at least the equivalent, at 1 atmosphere, of about 1975° C. to form calcium aluminide, an aluminum monohalide vapor and carbon monoxide gas in a first reaction chamber.

The aluminum monohalide and the carbon monoxide gases formed in this reaction may then be transported to a second, cooler, reaction chamber where they may be further reacted at a lower temperature, of no more than the equivalent, at 1 atmosphere, of about 1325° C. to form the aluminum trihalide, alumina, and carbon, as shown in equation (2).

The alumina and carbon from the reaction shown in equation (2) may be recycled back to the reaction of equation (1). The aluminum trihalide from the reaction of equation (2) and the calcium aluminide from the reaction in equation (1) may then be reacted together in the reaction shown in equation (3) to produce metallic aluminum and calcium halide. This, for example, may be accomplished by circulating the aluminum trihalide produced in equation (2) back to the initial reaction chamber in which the calcium aluminide was formed. The calcium halide formed in the reaction of equation (3) may be then recycled back to the reaction of equation (1).

In this set of reactions, the only feed materials may be alumina and carbon and the only products are metallic aluminum and carbon monoxide with the remainder of the byproducts all recycled back into the process loop.

c. Alkaline Earth Metal Aluminide as Reducing Agent

As described above, the alkaline earth metal aluminide, e.g., calcium aluminide, produced in accordance with the invention may be subsequently reacted with stripping agents to recover either metal or electrolytically refined to produce both metals. Alternatively, however, the aluminide material may be used as a valuable reducing agent for the recovery of other metals from their corresponding metal compounds, e.g., from an oxide of the metal, in accordance with the following equation using calcium aluminide as an example of the reducing agent and R as the metal to be reduced:

$$CaAl_2 + 4RO \rightarrow 4R + Al_2O_3 + CaO$$

As an example of this type of reduction reaction, calcium aluminide may be used as a reducing agent to recover magnesium metal from magnesium oxide in accordance with the following equation:

$$CaAl_2 + 4MgO \rightarrow 4Mg_{(v)} + CaO \cdot Al_2O_3$$

The reduction is carried out at a temperature range of from about 1200° C. to about 1700° C. in an oxygen-free atmosphere at a pressure of about one atmosphere for a time period sufficient to reduce substantially all of the metal compound.

Examples of other metal compounds which can be reduced in accordance with the above equation include oxides of the alkali metals such as lithium oxide, sodium oxide, potassium oxide, rubidium oxide, and cesium oxide.

Metal compounds such as those listed above may be reduced by reaction with the alkaline earth metal aluminide at lower temperatures, i.e., below 1200° C., to form an alloy of aluminum and the reduced metal instead of vaporizing in accordance with the following equation, again using calcium aluminide as an example of the alkaline earth metal aluminide reducing agent:

$$CaAl_2 R'O \rightarrow R' + Al + CaO$$

Thus the invention provides an improved process for the carbothermic reduction and recovery of aluminum and/or alkaline earth metal values in an efficient manner which conserves energy without compromising purity or yield.

Having thus described the invention, what is claimed is:

1. A process for the production of a metal by reduction of a corresponding metal compound with an alkaline earth metal aluminide which comprises:
   (a) providing a source of alkaline earth metal aluminide;
   (b) providing a metal compound capable of being reduced by said alkaline earth metal aluminide;
   (c) reacting said alkaline earth metal aluminide with said metal compound to reduce said metal compound to a metal; and
   (d) recovering said metal reduced from said metal compound.

2. A process in accordance with claim 1 wherein the amount of alkaline earth metal aluminide is in stoichiometric excess of the amount needed to reduce substantially all of the metal in said metal compound.

3. A process in accordance with claim 2 wherein said metal compound is a metal oxide.

4. A process in accordance with claim 2 wherein said metal in said metal compound is selected from the class consisting of magnesium, lithium, sodium, potassium, rubidium and cesium.

5. A process in accordance with claim 1 wherein said alkaline earth metal aluminide and said metal compound are reacted together at a temperature of from about 1200° C.. to about 1700° C..

6. A process in accordance with claim 5 wherein said alkaline earth metal aluminide and said metal compound are reacted together for a time period sufficient to reduce substantially all of the metal in said metal compound.

7. A process in accordance with claim 6 wherein said step of reacting said metal compound with said alkaline earth metal aluminide to reduce said metal in said metal compound further includes simultaneously reducing a second metal as well consisting of one of the metals in said alkaline earth metal aluminide.

8. A process in accordance with claim 7 wherein the reaction of said metal compound and said alkaline earth metal aluminide is carried out at a temperature below about 1200° C.. to cause one of said metals in said alkaline earth metal aluminide to reduce and form an alloy with said reduced metal from said metal compound.

9. A process in accordance with claim 8 wherein said step of simultaneously reducing said metal of said metal compound and a second metal as well consisting of one of the metals in said alkaline earth metal aluminide further comprises reducing the aluminum in said alkaline earth metal aluminide.

10. A process in accordance with claim 9 wherein said alkaline earth metal is selected from the class consisting of calcium, barium, and strontium.

11. A process in accordance with claim 10 wherein said alkaline earth metal is calcium.

12. A process in accordance with claim 11 wherein said metal compound is a metal oxide.

13. A process in accordance with claim 12 wherein said step of reacting said metal oxide with said calcium aluminide to reduce said metal in said metal oxide and simultaneously reduce said aluminum in said calcium aluminide further includes oxidizing said calcium to form calcium oxide.

14. A process in accordance with claim 13 wherein said metal oxide consists essentially of magnesium oxide and said step of recovering said reduced metal derived from said metal oxide and said reduced aluminum derived from said calcium aluminide comprises recovering an aluminum-magnesium alloy.

15. A process for producing metal by reduction of a corresponding metal compound which comprises:
(a) contacting a metal compound capable of reacting with calcium aluminide with a stoichiometric excess of calcium aluminide to reduce said metal in said metal compound;
(b) separating said reduced metal from the remainder of the reactants; and
(c) recovering said reduced metal.

16. A process in accordance with claim 15 wherein said calcium aluminide and said metal compound are reacted together at a temperature of from about 1200° C.. to about 1700° C..

17. A process in accordance with claim 15 wherein said step of reacting said metal compound with said calcium aluminide to reduce said metal in said metal compound is carried out at a temperature below about 1200° C.. to simultaneously reduce the aluminum in said calcium aluminide as well and said step of recovering said reduced metal derived from said metal compound further includes the step of recovering said reduced aluminum derived from said alkaline earth metal aluminide.

18. A process in accordance with claim 17 wherein said metal compound is a metal oxide and said step of reacting said metal oxide with said calcium aluminide to reduce said metal in said metal oxide and simultaneously reduce said aluminum in said calcium aluminide further includes oxidizing said calcium to form calcium oxide.

19. A process in accordance with claim 18 wherein said metal oxide consists essentially of magnesium oxide and said step of recovering said reduced metal derived from said metal oxide and said reduced aluminum derived from said calcium aluminide further includes separating said calcium oxide from said reduced metals and recovering said reduced magnesium and said reduced aluminum.

20. A process for reducing the metal in a metal oxide with calcium aluminide which comprises the steps of:
(a) forming a mixture of a metal oxide capable of reacting with calcium aluminide to reduce said metal and a stoichiometric excess of calcium aluminide;
(b) reacting said mixture at a temperature of from about 1200° C.. to about 1700° C.. for a period of time sufficient to reduce substantially all of said metal in said metal oxide and to form at least one metal oxide from the metals in said calcium aluminide; and
(c) separating and recovering said reduced metal from the remainder of the reactants and reaction products.

21. A process in accordance with claim 20 wherein said metal oxide consists essentially of magnesium oxide; said step of reacting magnesium oxide with said calcium aluminide further includes reducing said aluminum in said calcium aluminide to metallic aluminum and oxidizing said calcium to form calcium oxide; and said step of recovering reduced said reduced metal further includes recovering an alloy of aluminum and magnesium by separating said reduced metals from said calcium oxide.

* * * * *

UNITED STATES PATENT AND TRADEMARK OFFICE
CERTIFICATE OF CORRECTION

PATENT NO. : 4,735,654
DATED : April 5, 1988
INVENTOR(S) : C. Norman Cochran and Melvin H. Brown It is certified that error appears in the above-identified patent and that said Letters Patent is hereby corrected as shown below:

Col. 9, line 34  Change "$4Al_2O_3 30\ 12C. + 2C.aX_2$" to $--4Al_2O_3 + 12C + 2CaX_2--$.

Col. 10, line 16  Change "$Al_2O_{3+CaO}$" to $--Al_2O_3+CaO--$.

Col. 10, line 43  Change "$CaAl_2R'O$" to $--CaAl_2 + R'O--$.

Signed and Sealed this

Third Day of January, 1989

Attest:

DONALD J. QUIGG

*Attesting Officer*      *Commissioner of Patents and Trademarks*